United States Patent
Rajput et al.

(10) Patent No.: US 8,831,955 B2
(45) Date of Patent: Sep. 9, 2014

(54) FACILITATING TANGIBLE INTERACTIONS IN VOICE APPLICATIONS

(75) Inventors: Nitendra Rajput, New Delhi (IN); Shrey Sahay, New Delhi (IN); Saurabh Srivastava, New Delhi (IN); Kundan Shrivastava, Faridabad (IN)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 13/222,443

(22) Filed: Aug. 31, 2011

(65) Prior Publication Data

US 2013/0054247 A1    Feb. 28, 2013

(51) Int. Cl.
- *G10L 21/00* (2013.01)
- *H04M 7/00* (2006.01)
- *G06F 3/01* (2006.01)
- *H04M 3/493* (2006.01)
- *G10L 15/22* (2006.01)

(52) U.S. Cl.
CPC .......... *H04M 3/4936* (2013.01); *H04M 7/0024* (2013.01); *G06F 3/011* (2013.01); *G10L 15/22* (2013.01)
USPC ........ 704/275; 704/270.1; 704/246; 455/566; 715/728

(58) Field of Classification Search
CPC .................... G06F 17/30554; G06F 17/30696; G06F 3/033; G06F 3/04886; G06F 3/167; G10L 15/22; G10L 15/265; G10L 2015/088; H04M 1/0235; H04M 2201/42; H04M 2250/62
USPC ............... 704/270, 246, 270.1, 275; 455/566; 345/156, 157; 340/963, 461; 707/759; 715/728
See application file for complete search history.

(56) References Cited

U.S. PATENT DOCUMENTS

| | | | | |
|---|---|---|---|---|
| 5,818,423 | A  * | 10/1998 | Pugliese et al. | 345/157 |
| 6,175,954 | B1 | 1/2001 | Nelson et al. | |
| 6,424,357 | B1 * | 7/2002 | Frulla et al. | 715/728 |
| 7,474,318 | B2 | 1/2009 | Zhou et al. | |
| 2002/0010582 | A1 * | 1/2002 | Firman | 704/246 |
| 2002/0128843 | A1 * | 9/2002 | Firman | 704/270 |
| 2008/0119237 | A1 * | 5/2008 | Kim | 455/566 |
| 2009/0109175 | A1 * | 4/2009 | Fein et al. | 345/156 |
| 2009/0273560 | A1 | 11/2009 | Kalanithi et al. | |
| 2010/0332512 | A1 * | 12/2010 | Shpits | 707/759 |
| 2011/0006892 | A1 * | 1/2011 | Karpinsky | 340/461 |
| 2011/0175754 | A1 * | 7/2011 | Karpinsky | 340/963 |
| 2011/0270922 | A1 * | 11/2011 | Jones et al. | 709/204 |
| 2011/0270923 | A1 * | 11/2011 | Jones et al. | 709/204 |

OTHER PUBLICATIONS

Kumar, Arun, et al., "The spoken web application framework: user generated content and service creation through low-end mobiles", W4A2010—Technical, co-located with the 19th International World Wide Web Conference, Apr. 26-27, 2010, 10 pages, Raleigh, North Carolina, USA.

* cited by examiner

*Primary Examiner* — Vijay B Chawan
(74) *Attorney, Agent, or Firm* — Ference & Associates LLC

(57) ABSTRACT

Methods and arrangements for facilitating tangible interactions in voice applications. At least two tangible objects are provided, along with a measurement interface. The at least two tangible objects are disposed to each be displaceable with respect to one another and with respect to the measurement interface. The measurement interface is communicatively connected with a voice application. At least one of the two tangible objects is displaced with respect to the measurement interface, and the displacement of at least one of the at least two tangible objects is converted to input for the voice application.

25 Claims, 6 Drawing Sheets

FACILITATING TANGIBLE INTERACTIONS IN VOICE APPLICATIONS

BACKGROUND

The lack of internet access in many parts of the world, especially in developing countries, has given rise to voice applications with a capability for user-generated content. These permit a user to phone into a number and access voice application sites analogous to websites, yet controlled, delivered and administered via audio and voice. Voice application platforms and associated sites thus represent tremendous potential for utility but, unfortunately, significant challenges can arise in ensuring the integrity and viability of an audio interface and connection, and also in accommodating users for whom spoken communication might present challenges.

BRIEF SUMMARY

In summary, one aspect of the invention provides a method comprising: providing at least two tangible objects; providing a measurement interface; disposing the at least two tangible objects to each be displaceable with respect to one another and with respect to the measurement interface; communicatively connecting the measurement interface with a voice application; displacing at least one of the two tangible objects with respect to the measurement interface; and converting the displacement of at least one of the at least two tangible objects to input for the voice application.

Another aspect of the invention provides an apparatus comprising: a measurement interface; at least two tangible objects being displaceable with respect to one another and with respect to the measurement interface; at least one processor; and a computer readable storage medium having computer readable program code embodied therewith and executable by the at least one processor, the computer readable program code comprising: computer readable program code configured to communicatively connect said measurement interface with a voice application; and computer readable program code configured to convert displacement of at least one of said at least two tangible objects to input for the voice application.

An additional aspect of the invention provides a computer program product comprising: a computer readable storage medium having computer readable program code embodied therewith, the computer readable program code comprising: computer readable program code configured to communicatively connect a measurement interface with a voice application; and computer readable program code configured to convert displacement of at least one of at least two tangible objects to input for the voice application, the at least two tangible objects being displaceable with respect to one another and with respect to the measurement interface.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
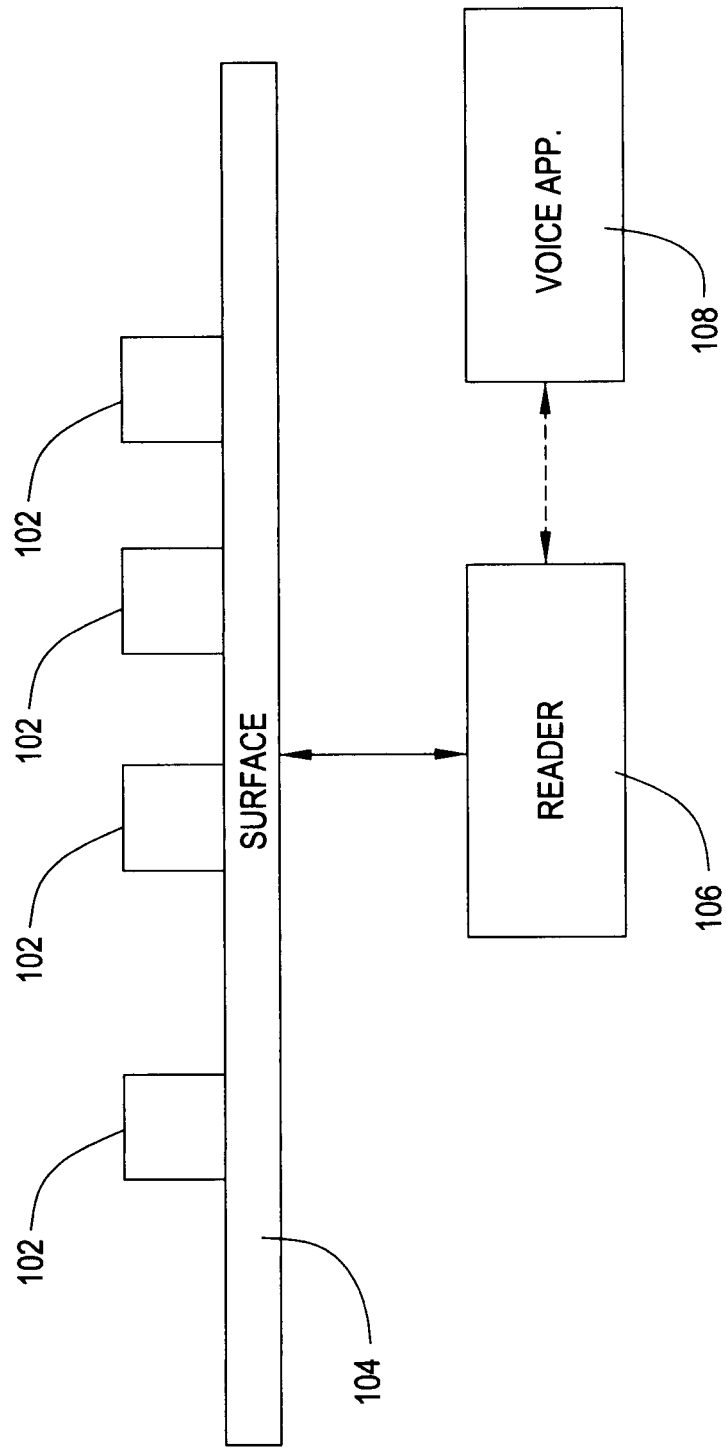
FIG. 1 schematically illustrates an arrangement of tangible objects with a measurement interface for communicating with a voice application.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-4. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6 whether on a server computer, a client computer, a node computer in a distributed network, or any combination thereof.

Figure 2:
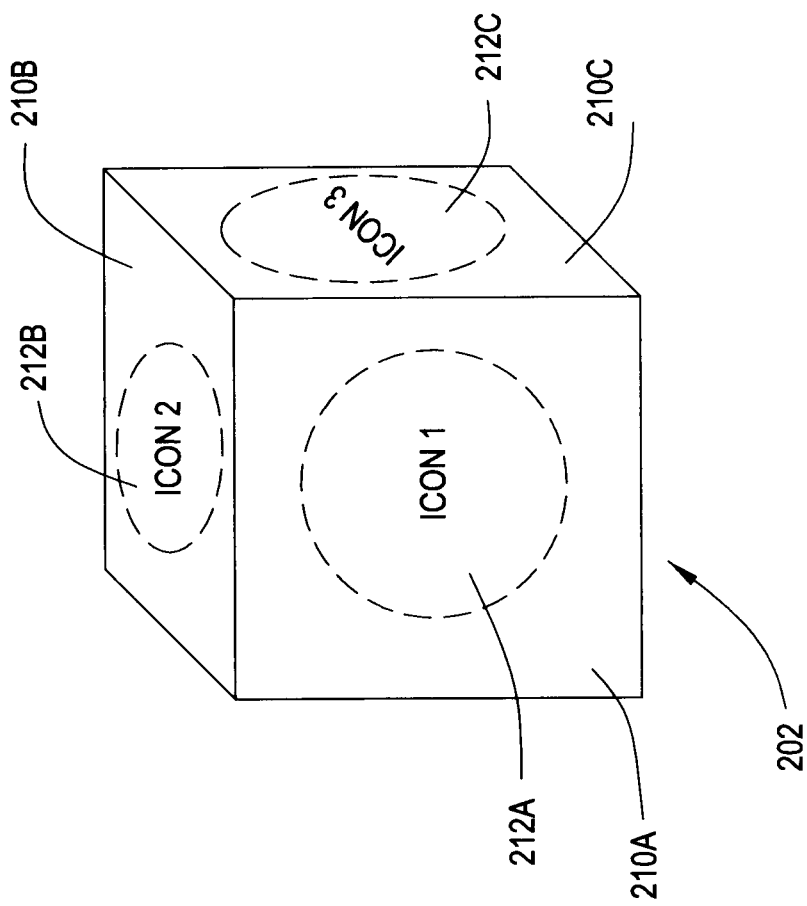
FIG. 2 illustrates, in perspective view, a cube for being employed in communicating with a voice application.
Figure 3:
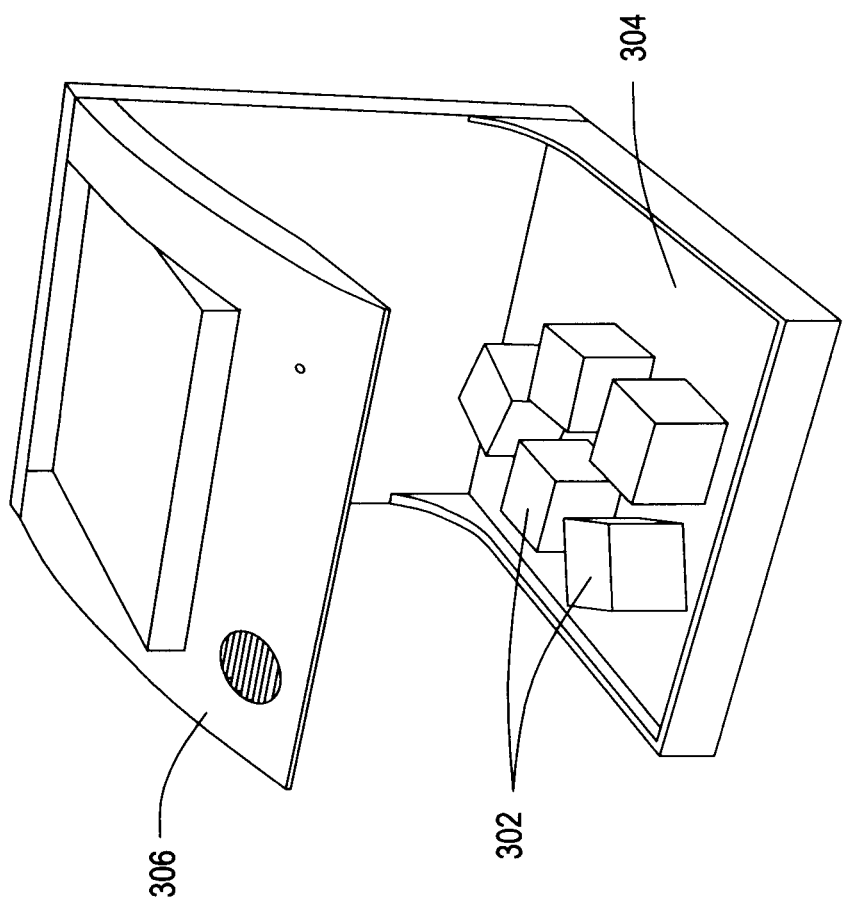
FIG. 3 illustrates, in perspective photographic view, an arrangement of cubes and a reader for being employed in communicating with a voice application.
Figure 4:
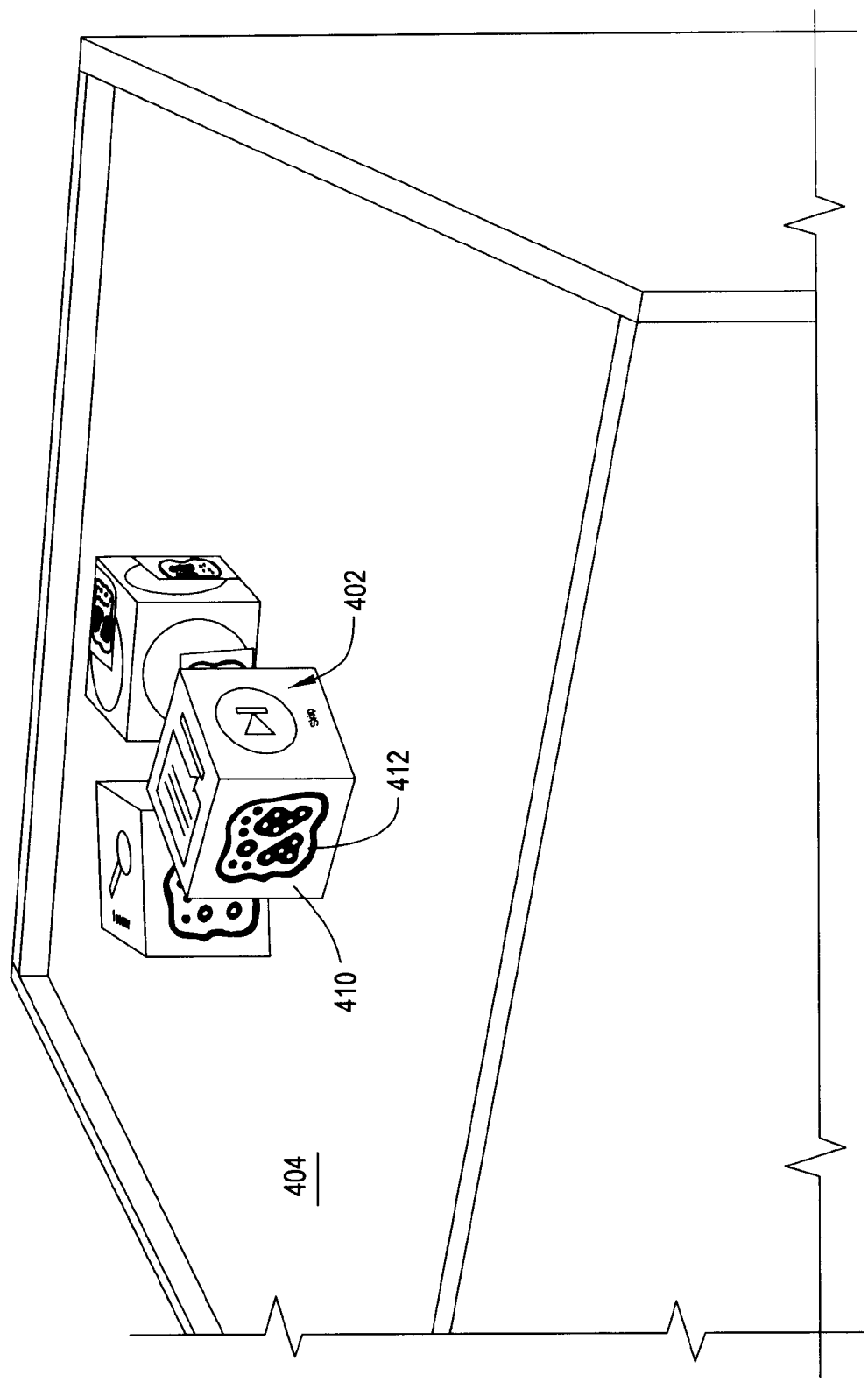
FIG. 4 illustrates, in perspective photographic view, a variant arrangement of cubes and a reader for being employed in communicating with a voice application.

To facilitate easier reference, in advancing from FIG. 1 to and through FIG. 4, a reference numeral is advanced by a multiple of 100 in indicating a substantially similar or analogous component or element with respect to at least one component or element found in at least one earlier figure among FIGS. 1-4.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone, which can also be referred to as "touch tone" or "telephone touch tone").

By way of further background in accordance with at least one embodiment of the invention, SWAF (Spoken Web Application Framework) can be used in creating VoiceSites. Background information on SWAF may be found in A. Kumar et al., "The Spoken Web Application Framework User Generated Content and Service Creation through low-end mobiles" in 7th International Cross-Disciplinary Conference on Web Accessibility (W4A; collocated with World Wide Web Conference, 2010).

In accordance with at least one embodiment of the invention, there is broadly contemplated herein, a voice application with a capability for user generated audio content (such as VoiceSites).

Generally, it has been found that interactions, as generally employed for voice applications with a capability for user generated audio content (such as VoiceSites), can present significant obstacles to usability for low-literacy users and/or those for whom spoken discourse might present special difficulties. As a result, the potential error rate is significant. Accordingly, there are broadly contemplated herein, in accordance with at least one embodiment of the invention, arrangements for interacting tangibly and directly with a voice application so as to more readily accommodate individuals for whom spoken discourse might present special difficulties or who otherwise might have trouble with navigating a voice application.

As such, broadly contemplated herein, in accordance with at least one embodiment of the invention, are visual modalities (e.g., graphical clues) employed in conjunction with tangible interfaces that greatly facilitate user access to voice applications.

FIG. 1 schematically illustrates an arrangement of tangible objects with a measurement interface for communicating with a voice application. As shown, a set of tangible objects 102 are disposed on a surface 104. Objects 102 (which, for example, may be in the form of cubes), are displaceable so that they can undergo translational motion with respect to the surface 104 and each other.

As shown, in accordance with at least one embodiment of the invention, surface 104 is in communication with a reader 106. Reader 106 is configured to measure the displacement of objects 102 with respect to surface 104 as well as ascertain their position and orientation with respect to surface 104 (e.g., via ascertaining two-dimensional positional coordinates of edges of an object 102 with respect to surface 104). Further, reader 106 is configured to ascertain content of a surface of an object 102 (e.g., that surface of object 102 which contacts and is disposed adjacent surface 104).

In accordance with at least one embodiment of the invention, surface 104 and reader 106 can assume essentially any form suitable for undertaking the reading and detection actions described heretofore. For instance, surface 104 could be a transparent or translucent surface, with reader 106 assuming the form of a photographic instrument capable of reading an icon or marking on a surface of an object 102. Alternatively, each surface of each object 102 could include a radio frequency tag or other type of resonant tag configured to convey predetermined content or information (e.g., on the basis of a frequency of such a tag), with reader 106 assuming the form of a detector capable of detecting such tags and their resonant frequencies (or other parameters). Alternatively, the object 102 can be embodied by actual objects, such as an item for purchase at a retail store, the image of which is captured by reader 106 and recognized as an object in inventory at the retail store.

In accordance with at least one embodiment of the invention, reader 106 is in communication with a voice application 108 (such as VoiceSites) in a manner to convey a command or other input to the voice application 108 that is directed by content that has been read by reader 106. As such, reader 106 is configured to convert content read from an object 102 into audio input that is suitable for voice application 108, or into an intermediate form that itself is converted into audio input for voice application 108.

FIG. 2 illustrates, in perspective view, a cube for being employed in communicating with a voice application. Cube 202, which can be employed in a manner as described hereinabove with respect to an object 102 as shown in FIG. 1, presents three orthogonally distinct surfaces 210a, 210b and 210c. Each surface 210a/b/c respectively includes a distinct icon 212a/b/c disposed thereupon (which can also be referred to, respectively, as Icon 1, Icon 2 and Icon 3). Each icon 212a/b/c visually or graphically conveys information or content associated with a distinct command or form of input for a voice application. Alternatively, each icon 212*a/b/c* could be supplemented by a detectable medium (e.g., embedded in or disposed upon the respective surface 210*a/b/c*) such as a resonant tag (as discussed further above) which itself carries content that is consistent with the respective icon 212*a/b/c* (or otherwise is configured to communicate with a reader and/or voice application in a manner to convey content that is consistent with the respective icon 212*a/b/c*).

In accordance with at least one embodiment of the invention, to the extent that cube 202 is disposed on a measurement surface (e.g., akin to the surface 104 discussed hereinabove with respect to FIG. 1) which itself is integrated or in communication with a reader (e.g., akin to the reader 106 discussed hereinabove with respect to FIG. 1), a surface 210*a/b/c* disposed adjacent to and in contact with such a measurement surface will present a respective icon 212*a/b/c* to the measurement surface. At the same time, each surface 210*a/b/c*, with respect to cube 202, has an opposite or "partner" surface that is disposed diametrically opposite the surface 210*a/b/c* in question. Thus, as one surface 210*a/b/c* is disposed adjacent to and in contact with a measurement surface and presents its constituent icon 212*a/b/c* to that measurement surface, the partner surface of surface 210*a/b/c* will be disposed away from the measurement surface and towards the view of a user. This partner surface, then, includes an icon identical to the one (212*a/b/c*) presented by the surface 210*a/b/c* disposed adjacent to and in contact with the measurement surface, such that the user will be readily aware of the icon 212*a/b/c* being presented to the measurement surface. Accordingly, cube 202 includes three pairs of diametrically opposite surfaces, wherein each surface within a pair presents one and the same icon.

FIG. 3 illustrates, in perspective photographic view, an arrangement of cubes and a reader for being employed in communicating with a voice application. As shown, cubes 302 are disposed for translational displacement with respect to each other and to a surface 304 on which the cubes 302 are disposed. A reader 306 extends over surface 304, in spaced-apart relation with respect to the surface 304. Cubes 302 have surfaces analogous to those discussed hereinabove with respect to surfaces 210*a/b/c* of cubes 202 of FIG. 2. Here, reader 306 is configured to read icons disposed on surfaces that face away from surface 304 and towards reader 306. Alternatively, reader 306 can be integrated with or in communication with surface 304 such that icons (or other communicative media) disposed on or with respect to a surface of a cube 302 are read if the cube surface in question is disposed adjacent to and in contact with surface 304.

FIG. 4 illustrates, in perspective photographic view, a variant arrangement of cubes and a reader for being employed in communicating with a voice application. As shown, cubes 402 are disposed for translational displacement with respect to each other and to a surface 404 on which the cubes 402 are disposed. A reader, which may be analogous to the reader 106 shown and described with respect to FIG. 1, is not shown here, but is disposed under measurement surface 404 and is in communicative communication therewith. Cubes 402 have faces 410 analogous to those discussed hereinabove with respect to faces 210*a/b/c* of cubes 202 of FIG. 2, with each face 410 including an icon 412 analogous to those discussed hereinabove with respect to icons 412*a/b/c* of cubes 202 of FIG. 2. Here, the reader (not shown) is configured to read icons 412 disposed on cube surfaces that face towards surface 404; in this case, measurement surface 404 is translucent while the reader reads the icons 412 through the surface 404.

In accordance with at least one embodiment of the invention, and with continued reference to FIGS. 1-4 simultaneously, it should be appreciated that displacement of a cube (e.g., such as one as indicated at 202 in FIG. 2, at 302 in FIG. 3 and/or at 402 in FIG. 4) and/or a tangible object (e.g., such as one as indicated at 102 in FIG. 1), in at least one specific, predetermined direction (e.g., left or right) is sufficient to trigger conveyance of a command to a reader (e.g., 102/202/302). Such displacement can result from an action such as turning a cube or object to present one face (e.g., 210*a/b/c* or 410) of the cube or object towards a measurement surface (e.g., 104/204/304/404) in place of another face. Such displacement can alternatively or additionally involve imparting translational movement to a cube or object with respect to a measurement surface. It is conceivable to reserve translational movement of a cube or object (with respect to a measurement surface) for one type of command and mere repositioning/reorientation of a cube or object (e.g., turning a cube or object onto one surface as opposed to another surface) for another type of command. The latter type of command can be embodied by a direct command (e.g., "forward") consistent with the icon associated with the opposing pair of cube or object faces in question (wherein one face of the pair of faces ends up being disposed adjacent to and in contact with a measurement surface) while the former type of command can be embodied by a general action, such as skipping an item of an audio navigation menu.

In accordance with at least one embodiment of the invention, turning a cube or tangible object (102/202/302/402) so that a different face (e.g., 210*a/b/c* or 410) is disposed towards the measurement surface (104/204/304/404) will trigger a command to the voice application that the user wants to move to another part of the voice application (e.g., to another part of a VoiceSite). Alternatively, another face of the cube or object (102/202/302/402) can have a specific command associated with it, such as moving to a next item, or going back to a main menu etc.

In accordance with at least one embodiment of the invention, by way of other actions, a face of the cube or object (e.g., 210*a/b/c* or 410) can remain face-down against the measurement surface (104/204/304/404), during which the cube or object (102/202/302/402) can be moved (e.g., slid) to a different portion of the measurement surface. As an example, the cube or object (102/202/302/402) can be moved to the left to compel the voice application to move back or "rewind" one sentence, or can be moved to the right to compel the voice application to move forward or "fast forward" one sentence.

It can be appreciated from the foregoing that, in accordance with at least one embodiment of the invention, a user interface comprising tangible objects can assist low-literacy users in navigating a voice application. It is also conceivable to extend the utility of such an interface for use with applications other than voice applications (e.g., with computer software that normally relies on keyboard input). On the other hand, icons as described hereinabove can be supplemented by identifying media that would be of assistance to visually impaired individuals, such as a Braille rendition of a command associated with an icon.

Figure 5:
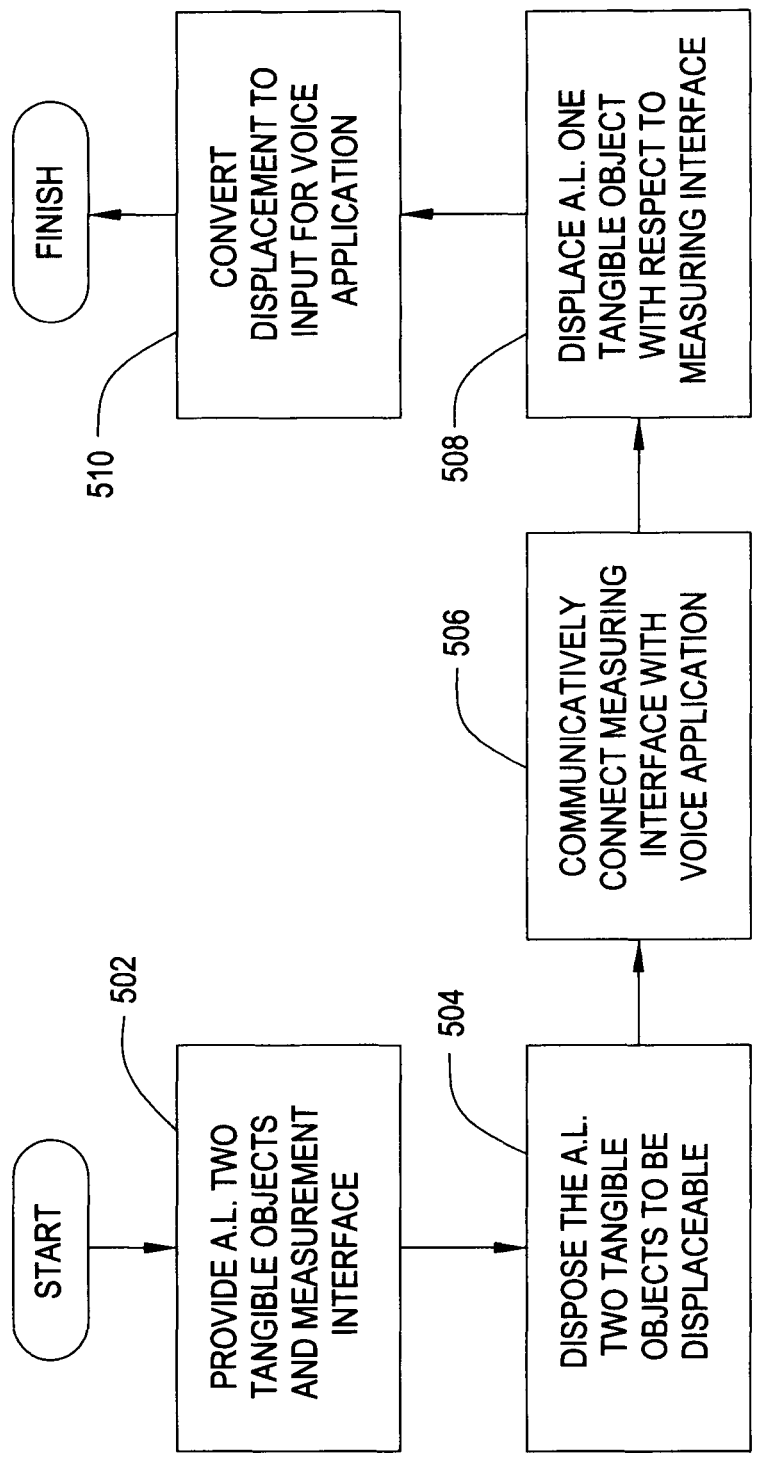
FIG. 5 sets forth a process more generally for facilitating tangible interactions in voice applications.

FIG. 5 sets forth a process more generally for facilitating tangible interactions in voice applications in voice applications, in accordance with at least one embodiment of the invention. It should be appreciated that a process such as that broadly illustrated in FIG. 5 can be carried out on essentially any suitable computer system or set of computer systems, which may, by way of an illustrative and on-restrictive example, include a system such as that indicated at 12' in FIG. 6. In accordance with an example embodiment, most if not all of the process steps discussed with respect to FIG. 5 can be performed by way a processing unit or units and system memory such as those indicated, respectively, at 16' and 28' in FIG. 6.

As shown in FIG. 5, at least two tangible objects are provided, along with a measurement interface (502). The at least two tangible objects are disposed to each be displaceable with respect to one another and with respect to the measurement interface (504). The measurement interface is communicatively connected with a voice application (506). At least one of the two tangible objects is displaced with respect to the measurement interface (508), and the displacement of at least one of the at least two tangible objects is converted to input for the voice application (510).

Figure 6:
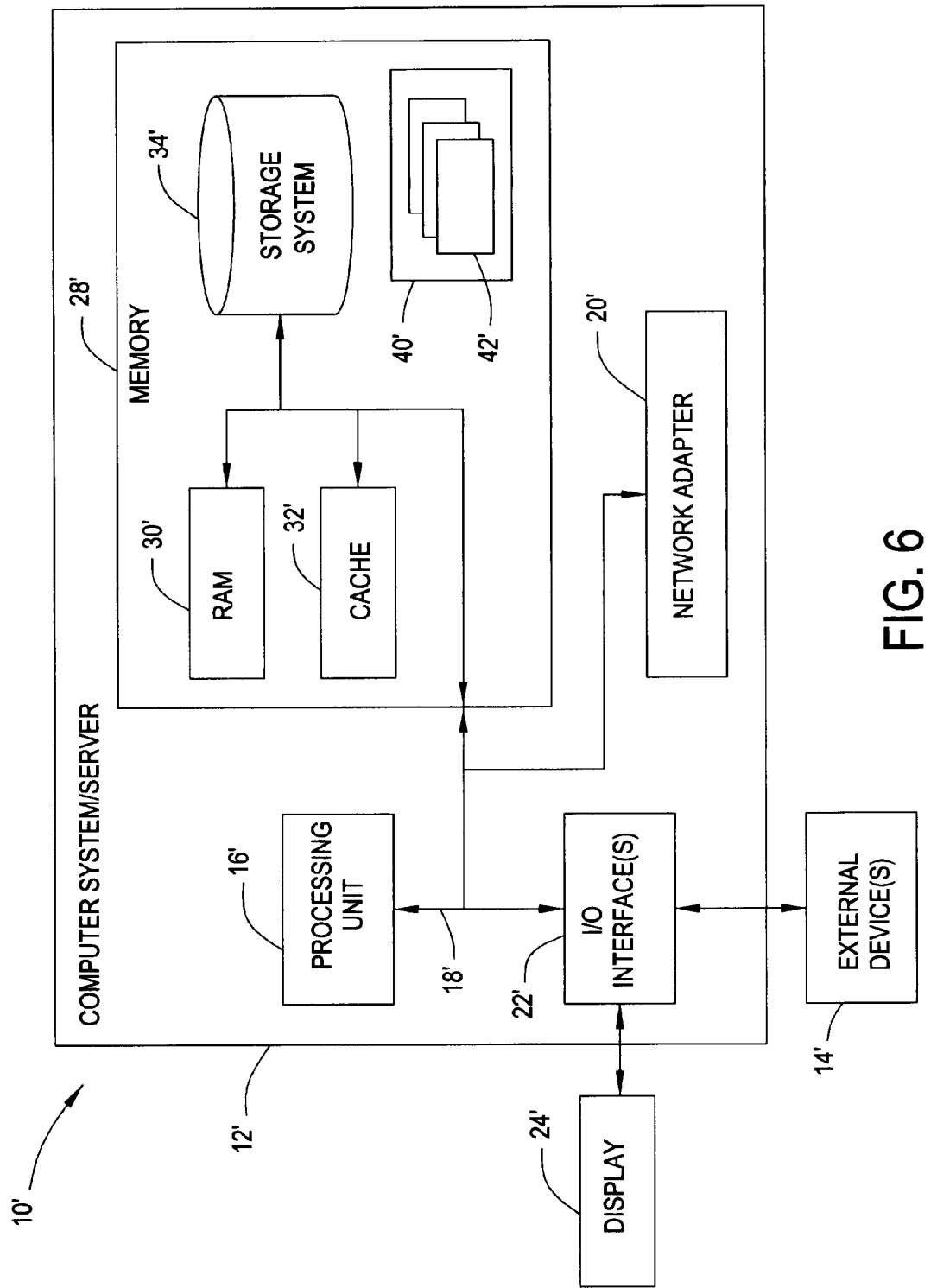
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention. Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   providing at least two tangible objects;
   providing a measurement interface;
   disposing the at least two tangible objects to each be displaceable and separable with respect to one another and with respect to the measurement interface;
   communicatively connecting the measurement interface with a voice application, the voice application comprising a telecom voice application with at least one voice site;
   displacing at least one of the two tangible objects with respect to the measurement interface; and
   converting the displacement of at least one of the at least two tangible objects to input for the voice application.

2. The method according to claim 1, wherein said converting comprises converting the displacement of at least one of the at least two tangible objects to audio input for the voice application.

3. The method according to claim 1, wherein said displacing comprises displacing at least one of the at least two tangible objects via translational movement with respect to the measurement interface.

4. The method according to claim 1, wherein said displacing comprises displacing at least one of the at least two tangible objects via changing an orientation of at least one of the at least two tangible objects with respect to the measurement interface.

5. The method according to claim 1, wherein said providing of a measurement interface comprises providing a surface.

6. The method according to claim 5, wherein said disposing comprises disposing the at least two tangible objects on the surface.

7. The method according to claim 6, wherein:
at least one of the at least two tangible objects comprises a pair of opposing faces; and
said disposing comprises disposing one of the opposing faces on the surface.

8. The method according to claim 7, wherein:
each of the opposing faces comprises a visual icon corresponding to input for the voice application; and
the visual icon of one of the opposing faces is the same as the visual icon on the other of the opposing faces.

9. The method according to claim 5, wherein said providing of a measurement interface further comprises providing a reader.

10. The method according to claim 9, further comprising disposing the reader in at least one taken from the group consisting of: spaced-apart relation with respect to the surface, above the surface, below the surface.

11. The method according to claim 9, wherein said providing of a reader comprises providing a photographic reader.

12. The method according to claim 1, wherein the at least two tangible objects comprise at least one taken from the group consisting of: a cube, an item for purchase.

13. An apparatus comprising:
a measurement interface;
at least two tangible objects being displaceable and separable with respect to one another and with respect to the measurement interface;
at least one processor; and
a computer readable storage medium having computer readable program code embodied therewith and executable by the at least one processor, the computer readable program code comprising:
computer readable program code configured to communicatively connect said measurement interface with a voice application, the voice application comprising a telecom voice application with at least one voice site; and
computer readable program code configured to convert displacement of at least one of said at least two tangible objects to input for the voice application.

14. The apparatus according to claim 13, wherein said computer readable program code is configured to convert the displacement of at least one of said at least two tangible objects to audio input for the voice application.

15. The apparatus according to claim 13, wherein said computer readable program code is configured to convert displacement which includes at least one of said at least two tangible objects undergoing translational movement with respect to said measurement interface.

16. The apparatus according to claim 13, wherein said computer readable program code is configured to convert displacement which includes a change of orientation of at least one of said at least two tangible objects with respect to said measurement interface.

17. The apparatus according to claim 13, wherein said measurement interface comprises a surface.

18. The apparatus according to claim 17, wherein said at least two tangible objects are disposed on said surface.

19. The apparatus according to claim 18, wherein:
at least one of said at least two tangible objects comprises a pair of opposing faces; and
one of said opposing faces is disposed on said surface.

20. The apparatus according to claim 19, wherein:
each of said opposing faces comprises a visual icon corresponding to input for the voice application; and
a visual icon of one of said opposing faces is the same as a visual icon on the other of said opposing faces.

21. The apparatus according to claim 17, wherein said measurement interface further comprises a reader.

22. The apparatus according to claim 21, wherein said reader is disposed in at least one taken from the group consisting of: spaced-apart relation with respect to said surface, above said surface, below said surface.

23. The apparatus according to claim 21, wherein said reader comprises a photographic reader.

24. The apparatus according to claim 13, wherein said at least two tangible objects comprise at least one taken from the group consisting of: a cube, an item for purchase.

25. A computer program product comprising:
a non-transitory computer readable storage medium having computer readable program code embodied therewith and executable by a processor, the computer readable program code comprising:
computer readable program code configured to communicatively connect a measurement interface with a voice application, the voice application comprising a telecom voice application with at least one voice site; and
computer readable program code configured to convert displacement of at least one of at least two tangible objects to input for the voice application, the at least two tangible objects being displaceable and separable with respect to one another and with respect to the measurement interface.

* * * * *